United States Patent
Steidl et al.

(10) Patent No.: US 9,751,403 B2
(45) Date of Patent: Sep. 5, 2017

(54) DIFFERENTIAL ASSEMBLY AND SPEED SENSOR MOUNTING ARRANGEMENT THEREFOR

(71) Applicant: Honda Motor Co., Ltd., Tokyo (JP)

(72) Inventors: Keith B. Steidl, North Lewisburg, OH (US); Dustin Schroeder, Milford Center, OH (US); Masahiro Yamaguchi, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/824,265

(22) Filed: Aug. 12, 2015

(65) Prior Publication Data

US 2016/0047450 A1    Feb. 18, 2016

Related U.S. Application Data

(60) Provisional application No. 62/036,558, filed on Aug. 12, 2014.

(51) Int. Cl.
*B60K 17/16* (2006.01)
*F16H 48/08* (2006.01)
*F16H 48/14* (2006.01)

(52) U.S. Cl.
CPC .......... *B60K 17/165* (2013.01); *F16H 48/08* (2013.01); *F16H 48/14* (2013.01); *F16H 48/147* (2013.01)

(58) Field of Classification Search
CPC ..... B60K 14/165; F16H 48/147; F16H 48/14; F16H 48/08
USPC ....................................................... 180/369
See application file for complete search history.

(56) References Cited

U.S. PATENT DOCUMENTS

| | | | |
|---|---|---|---|
| 3,138,970 A | * | 6/1964 | Costa ............... F16H 48/08 475/86 |
| 4,552,241 A | | 11/1985 | Suzuki |
| 4,700,797 A | | 10/1987 | Leiber |
| 4,757,870 A | | 7/1988 | Torii et al. |
| 4,854,414 A | | 8/1989 | Koide et al. |
| 4,895,217 A | | 1/1990 | Hueckler et al. |

(Continued)

FOREIGN PATENT DOCUMENTS

GB    2410303    5/2007

OTHER PUBLICATIONS

"Right Front Wheel Speed Sensor Signal Malfunction", www.moranbahweather.com_toyota_lc_trj12_rm_rm1151e_m_05_0780.pdf (Accessed Dec. 15, 2013).

*Primary Examiner* — Karen Beck
(74) *Attorney, Agent, or Firm* — Rankin, Hill & Clark LLP

(57) ABSTRACT

A differential assembly for a vehicle includes a drive train for transferring motive power from an engine drive member to the right and left drive shafts which are coupled, respectively, to ground engaging members of the vehicle. The drive train includes a rotating element operatively engaged to the drive member and to the right and left drive shafts. The differential assembly further includes a first speed sensor is arranged to measure rotational speed of (i) the rotating element or (ii) one of the right and left drive shafts, and a second speed sensor arranged to measure rotational speed of one of the right and left drive shafts. The second speed sensor arranged to measure rotational speed of the other of the right and left drive shafts when the first speed sensor is arranged to measure rotational speed of one of the right and left drive shafts.

18 Claims, 4 Drawing Sheets

(56) References Cited

U.S. PATENT DOCUMENTS

| | | | | |
|---|---|---|---|---|
| 4,953,670 | A * | 9/1990 | Chemelewski | G01P 3/488 188/181 A |
| 4,984,649 | A | 1/1991 | Leiber et al. | |
| 4,989,685 | A | 2/1991 | Matsuda | |
| 4,991,680 | A | 2/1991 | Shiba et al. | |
| 5,083,629 | A | 1/1992 | Chang | |
| 5,105,903 | A | 4/1992 | Buschmann | |
| 5,132,908 | A | 7/1992 | Eto et al. | |
| 5,366,041 | A | 11/1994 | Shiraishi et al. | |
| 5,385,513 | A * | 1/1995 | Ishii | B60K 17/08 475/198 |
| 5,486,757 | A * | 1/1996 | Easley | G01P 3/488 29/434 |
| 5,671,144 | A | 9/1997 | Ryan et al. | |
| 5,799,748 | A | 9/1998 | Origuchi | |
| 6,203,464 | B1 * | 3/2001 | Ishikawa | F16H 48/08 475/150 |
| 6,705,965 | B2 * | 3/2004 | Sullivan | F16C 19/56 475/220 |
| 6,810,317 | B2 | 10/2004 | Sauter et al. | |
| 7,205,760 | B2 * | 4/2007 | Swanson | B60B 35/121 324/174 |
| 7,241,243 | B2 * | 7/2007 | Duncan | B60K 17/16 324/174 |
| 7,957,881 | B2 | 6/2011 | Itoh | |
| 8,061,464 | B2 | 11/2011 | Boesch | |
| 8,230,739 | B2 * | 7/2012 | LeMerise | B60B 35/08 73/491 |
| 8,257,213 | B2 * | 9/2012 | Komada | B60K 6/36 475/5 |
| 8,527,178 | B2 | 9/2013 | Noguchi et al. | |
| 8,561,749 | B2 * | 10/2013 | Person | B60K 17/16 180/337 |
| 8,565,995 | B2 | 10/2013 | Kueperkoch et al. | |
| 2012/0226469 | A1 | 9/2012 | Premkumar et al. | |
| 2013/0275015 | A1 | 10/2013 | Li et al. | |

* cited by examiner

DIFFERENTIAL ASSEMBLY AND SPEED SENSOR MOUNTING ARRANGEMENT THEREFOR

The present application claims priority to U.S. Prov. Patent App. Ser. No. 62/036,558, filed on Aug. 12, 2014, which is incorporated herein in its entirety.

BACKGROUND

All-terrain vehicles (ATVS), multipurpose utility vehicles (MUVS) and the like are often provided with differentials at the front and/or rear ground engaging members (e.g., wheels or tracks) for distributing or proportioning torque from the engine to the ground engaging members of the vehicle. Typically, such differentials include or are associated with an input shaft or pinion gear driven directly by the engine, right and left drive shafts connected directly to ground engaging members of the vehicle, and intermeshing gears for transmitting torque from the input shaft to the right and left drive shafts in a controlled manner. It is sometimes desirable to obtain information on the various moving parts of the differential or coupled to the differential. A unique challenge associated with these types of vehicles is that these types of vehicles are often used in harsh environments (e.g., off-road) and so any equipment monitoring or sensing must be robustly mounted so as to reduce the likelihood of premature failure.

SUMMARY

According to one aspect, a differential assembly for a vehicle comprises a drive train for transferring motive power from an engine drive member to the right and left drive shafts which are coupled, respectively, to ground engaging members of the vehicle. The drive train includes a rotating element operatively engaged to the drive member and to the right and left drive shafts. The differential assembly further includes a first speed sensor arranged to measure rotational speed of (i) the rotating element or (ii) one of the right and left drive shafts, and a second speed sensor arranged to measure rotational speed of one of the right and left drive shafts. The second speed sensor arranged to measure rotational speed of the other of the right and left drive shafts when the first speed sensor is arranged to measure rotational speed of one of the right and left drive shafts.

According to another aspect, a vehicle comprises at least two driven ground engaging members and an engine for providing motive power for driving the at least two driven ground engaging members. A drive member is rotatably driven by the engine. Right and left drive shafts are coupled, respectively, to the at least two driven ground engaging members. A differential is operatively connected to the drive member and to right and left drive shafts for proportioning the motive power from the engine between the at least two driven ground engaging members. The differential includes a ring gear operatively engaged to the drive member and a differential housing integrally formed or nonrotatably mounted to the ring gear. A first speed sensor is arranged to measure rotational speed of the left drive shaft. A second speed sensor is arranged to measure rotational speed of the right drive shaft.

According to a further aspect, a speed sensor mounting arrangement for a vehicle differential assembly includes a first speed sensor arranged to measure rotational speed of a left drive shaft of the differential assembly and a second speed sensor arranged to measure rotational speed of a right drive shaft of the differential assembly. The drive shafts are operatively connected to the ring gear via cam followers and face cams for transferring motive power from a pinion gear of an engine to ground engaging members associated with the right and left drive shafts.

DETAILED DESCRIPTION

Figure 1:
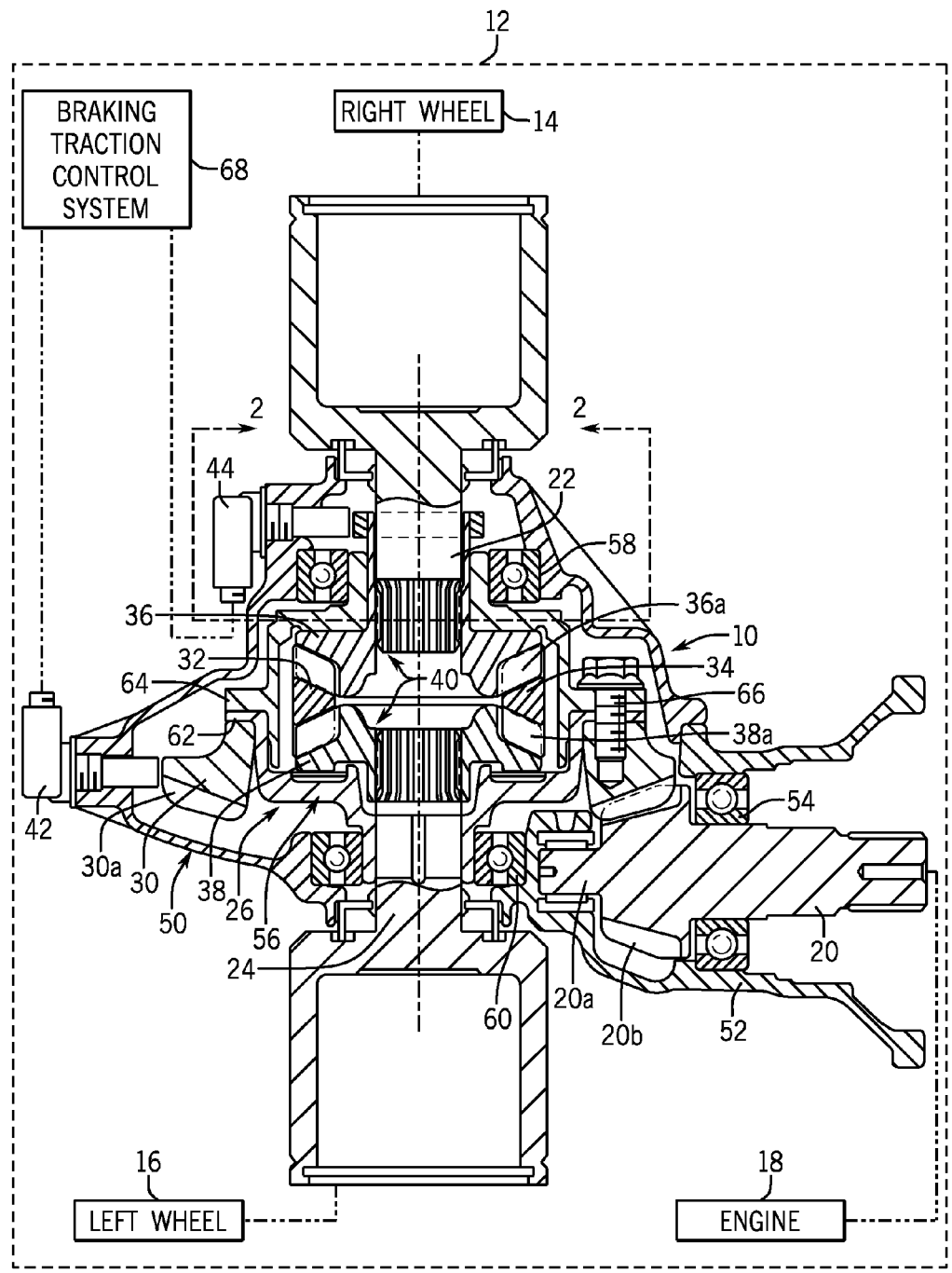
FIG. 1 is a schematic cross-sectional view of a vehicle having a differential assembly and speed sensor mounting arrangement according to an exemplary embodiment.

Referring now to the drawings wherein the showings are for purposes of illustrating one or more exemplary embodiments and not for purposes of limiting the same, FIG. 1 shows a differential assembly 10 for a vehicle 12 (vehicle 12 shown schematically) according to an exemplary embodiment. The vehicle 12 includes at least two driven ground engaging members 14, 16 and an engine 18 for providing motive power for driving the at least two driven ground engaging members 14, 16 (ground engaging members 14, 16 and engine 18 shown schematically). In one embodiment, the ground engaging members 14, 16 can be front wheels on the vehicle 12. Although, it should be appreciated that the ground engaging members can be tracks and the like. The vehicle 12 and/or the differential assembly 10 can include an input shaft or pinion gear 20 (i.e., a drive member) that is rotatably driven by the engine 18 for transferring motive power from the engine 18 to the ground engaging members 14, 16 of the vehicle 12, and right and left drive shafts 22, 24 coupled, respectively, to the ground engaging members 14, 16 of the vehicle 12. Additionally, the vehicle 12 and/or the differential assembly 10 can further include a drive train or differential 26 that operatively connects the pinion gear 20 to the right and left drive shafts 22, 24 for proportioning the motive power from the engine 18 between the ground engaging members 14, 16.

As shown, according to one aspect the differential 26 can include a ring gear 30 (i.e., a rotating element) arranged for toothed engagement with the pinion gear 20, cam followers 32, 34 arranged for toothed engagement with the ring gear 30 and right and left face cams 36, 38 arranged for toothed engagement with the cam followers 32, 34. It should be appreciated that pinion gears can be used instead of the cam followers 32, 34 and side gears can be used instead of the face cams 36, 38. Also, the right face cam 36 is nonrotatably coupled to the right drive shaft 22 such as by the illustrated splined connection 40 and the left face cam 38 is likewise nonrotatably coupled to the left drive shaft 24. Accordingly, the ring gear 30 is meshingly coupled to the pinion gear 20, the cam followers 32, 34 are meshingly coupled to the ring gear 30 and the pair of face cams 36, 38 is meshingly coupled to the cam followers 32, 34. By this arrangement, the drive shafts 22, 24 are operatively connected to the ring gear 30 via the cam followers 32, 34 and the face cams 38, 40 for transferring motive power from the pinion gear 20 of the engine 18 to the ground engaging members 14, 16 associated with the right and left drive shafts 22, 24.

Further, the vehicle 12 and/or the differential assembly 10 include a first speed sensor 42 arranged to measure rotational speed of the ring gear 30 and a second speed sensor 44 arranged to measure rotational speed of one of the right and left drive shafts 22 or 24. As shown, in the illustrated embodiment, the second speed sensor 44 is particularly arranged to measure the rotational speed of the right drive shaft 22, but it should be appreciated that the differential assembly 10 could be alternatively configured so that the second speed sensor 44 could be arranged to measure rotational speed of the left drive shaft 24. In either case, a speed sensor mounting arrangement is provided for the differential assembly 10 wherein the first speed sensor 42 is arranged to measure rotational speed of the ring gear 30 of the differential assembly 10 and the second speed sensor 44 is arranged to measure rotational speed of one of the right drive shaft 22 or the left drive shaft 24 (i.e., the right drive shaft 22 in the illustrated embodiment).

As shown in the illustrated embodiment, the ring gear 30, cam followers 32, 34 and face cams 36, 38 can be accommodated or housed in a gear casing 50. The casing 50 can be integral with or operatively connected to an input shaft or pinion gear housing portion 52 that accommodates or houses the pinion gear 20. As is known by those skilled in the art, the pinion gear 20 can be rotatably mounted within the housing portion 52 via a suitable bearing 54 and a forward end 20a of the pinion gear 20 can be journaled to one or both of the housing portion 52 and the casing 50. Teeth 20b of the pinion gear 20 meshingly engage teeth 30a of the ring gear for transferring rotation from the input gear 20 to the ring gear 30. In the illustrated embodiment, the ring gear 30 includes an internal differential housing 56 integrally formed or nonrotatably mounted thereto that accommodates the cam followers 32, 34 and at least toothed portions or teeth 36a, 38a of the face cams 36, 38. The cam followers 32, 34 and toothed portions 36a, 38a of the face cams 36, 38 can be housed in the differential housing 56. As shown, the differential housing 56 is rotatably received within the casing 50 so as to be housed or accommodated within the casing 50. In particular, suitable bearings 58, 60 can be used for rotatably mounting the differential housing 56 within the casing 50 as is known and understood by those skilled in the art. The differential housing 56 of the illustrated embodiment is formed of a first differential housing part 62 and second differential housing part 64 that are together secured to the ring gear 30 such as by bolts (e.g., bolt 66).

At least one of the first and second speed sensors 42, 44 can be mounted to the casing 50. In the illustrated embodiment, each or both of the first and second speed sensors 42, 44 are mounted to the casing 50. Also, as shown schematically, each of the first and second speed sensors 42, 44 can be operatively connected to a braking traction control system 68; although, this is not required. It should be appreciated that the exemplary first and second speed sensors 42, 44 can be operatively connected to alternative vehicle systems (e.g., an active suspension system). In one embodiment, the braking traction control system 68 uses input from the first and second speed sensors 42, 44 to calculate independent rotational speed for each of the drive shafts 22, 24. The second speed sensor 44 of the illustrated embodiment is located adjacent the right drive shaft 22 and thus can directly measure the rotational speed of the right drive shaft 22 and provide this as an input to the braking traction control system 68. The first speed sensor 42 can measure the rotational speed of the ring gear 30 and provide this as an input to the braking traction control system 68.

As is known and understood by those skilled in the art, the braking traction control system 68 can use such input from the first and second speed sensors 42, 44 to calculate the rotational speed of the left drive shaft 24 (i.e., the drive shaft that does not have a speed sensor measuring directly its rotational speed). In one embodiment, the rotational speeds for each of the right drive shaft 22 and the left drive shaft 24 are used by the braking traction control system 68 to selectively apply braking to the right wheel 14 and/or the left wheel 16 to improve traction control for the vehicle 10. In particular, in the illustrated embodiment, the first speed sensor 42 is mounted to the casing 50 at a location axially adjacent the ring gear 30 and the second speed sensor 44 is mounted to the casing 50 adjacent whichever of the right drive shaft 22 or the left drive shaft 24 for which the second speed sensor 44 is arranged to measure rotation. In the illustrated embodiment, this is the right drive shaft 22 so that the second speed sensor 44 is mounted to the casing 50 adjacent the right drive shaft 22.

In addition, the vehicle 12 and/or the differential assembly 10 can include a pulsar ring 70 arranged to work in conjunction with the second speed sensor 44 for measuring rotational speed of the right drive shaft 22. In particular, the pulsar ring 70 can be nonrotatably mounted to the right drive shaft 22 for corotation therewith. Moreover, the pulsar ring 70 can be axially aligned with the second speed sensor 44 for cooperating therewith in measuring rotational speed of the right drive shaft 22. In the embodiment shown in FIGS. 1 and 2, the pulsar ring 70 is nonrotatably connected directly to the face cam 36 that is itself nonrotatably connected to the right drive shaft 22 via the splined connection 40. In an alternative embodiment (not shown), wherein the second speed sensor 44 would be mounted or arranged to measure rotational speed of the left drive shaft 24, the pulsar ring 70 could be mounted to the left face cam 38. In the embodiment illustrated, the pulsar ring 70 is housed in the casing 50 together with the ring gear 30, the cam followers 32, 34 and the face cams 36, 38. In particular, as shown best in FIG. 2, the pulsar ring 70 can be mounted to a portion 36b of the face cam 36 (i.e., the face cam 36 being associated with the right drive shaft 22), wherein the portion 36b is an axially extending portion that is housed within the casing 50 but extends axially outward from the differential housing 56 in a sleeve-type or annular relation relative to the drive shaft 22.

Figure 2:
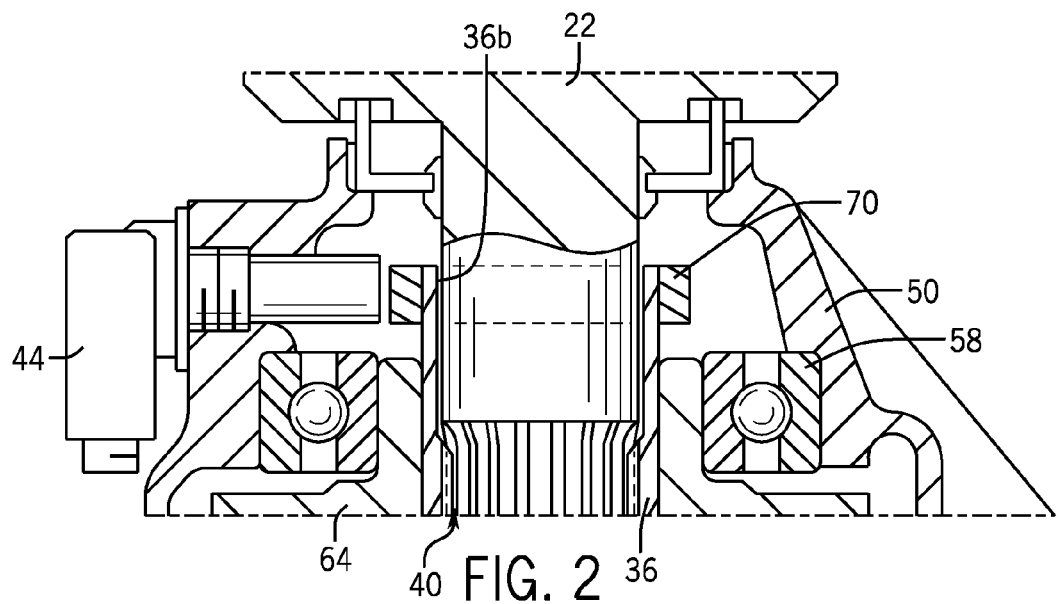
FIG. 2 is an enlarged partial perspective view of the differential assembly of FIG. 1 taken at the line 2-2 of FIG. 1 to show a pulsar ring mounted to a drive shaft face cam adjacent a speed sensor.
Figure 3:
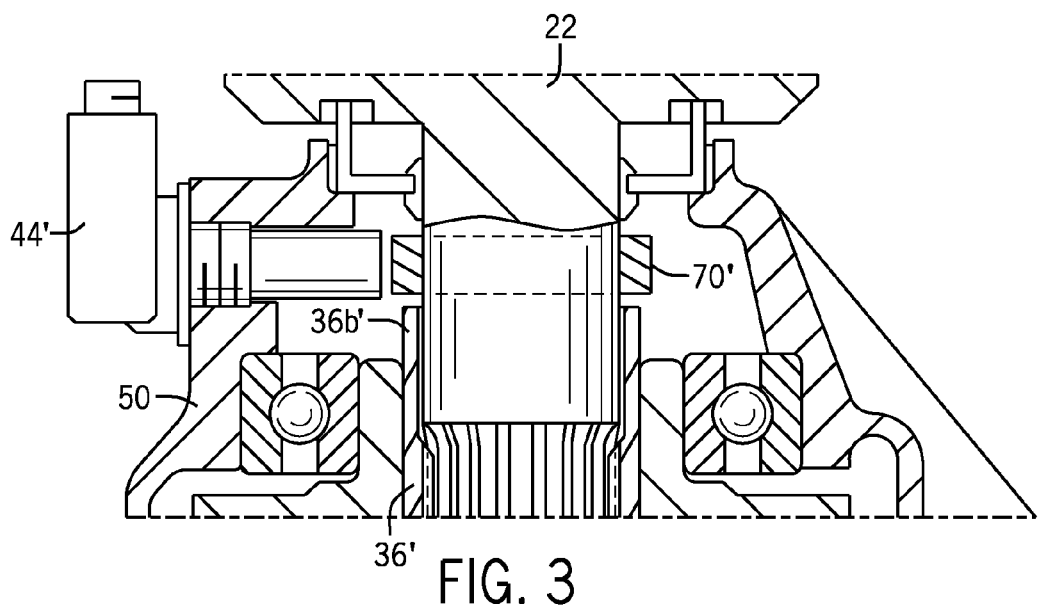
FIG. 3 is a partial cross-sectional view similar to FIG. 2 but showing a pulsar ring mounted directly to the drive shaft according to an alternate exemplary embodiment.

With reference to FIG. 3, an alternate embodiment is shown wherein a pulsar ring 70' is mounted directly to the right drive shaft 22 and portion 36b' of face cam 36' is axially abbreviated relative to the portion 36b of the face cam 36 shown in FIG. 2. Also in the embodiment illustrated in FIG. 3, the second speed sensor 44' is shown in a reversed orientation wherein the portion of the second speed sensor 44' that projects from the casing 50 is directed laterally outwardly toward the right wheel 14 versus the orientation shown for the second speed sensor 44 in FIG. 2 wherein the projecting portion of the second speed sensor 44 that extends out of the casing 50 projects laterally inwardly away from the right wheel 14. While the embodiment of FIG. 3 illustrates the second speed sensor 44' associated with the right draft shaft 22 (like second speed sensor 44 of FIGS. 1 and 2), it is to be appreciated by those skilled in the art that the arrangement could be modified so that the second speed sensor 44' is provided in association with the opposite, left drive shaft (e.g., left drive shaft 24).

The exemplary embodiments of FIGS. 1-2 and FIG. 3 depict the first speed sensor 42 arranged to measure rotational speed of the ring gear 30 and the second speed sensor 44, 44' arranged to measure rotational speed of one of the right and left drive shafts (e.g., the right dive shaft 22). According to one aspect of FIGS. 1-2, the pulsar ring 70 for the second speed sensor 44 is mounted the face cam 36, and according to another aspect of FIG. 3, the pulsar ring 70' for the second speed sensor 44' is mounted to the right drive shaft 22.

Figure 4:
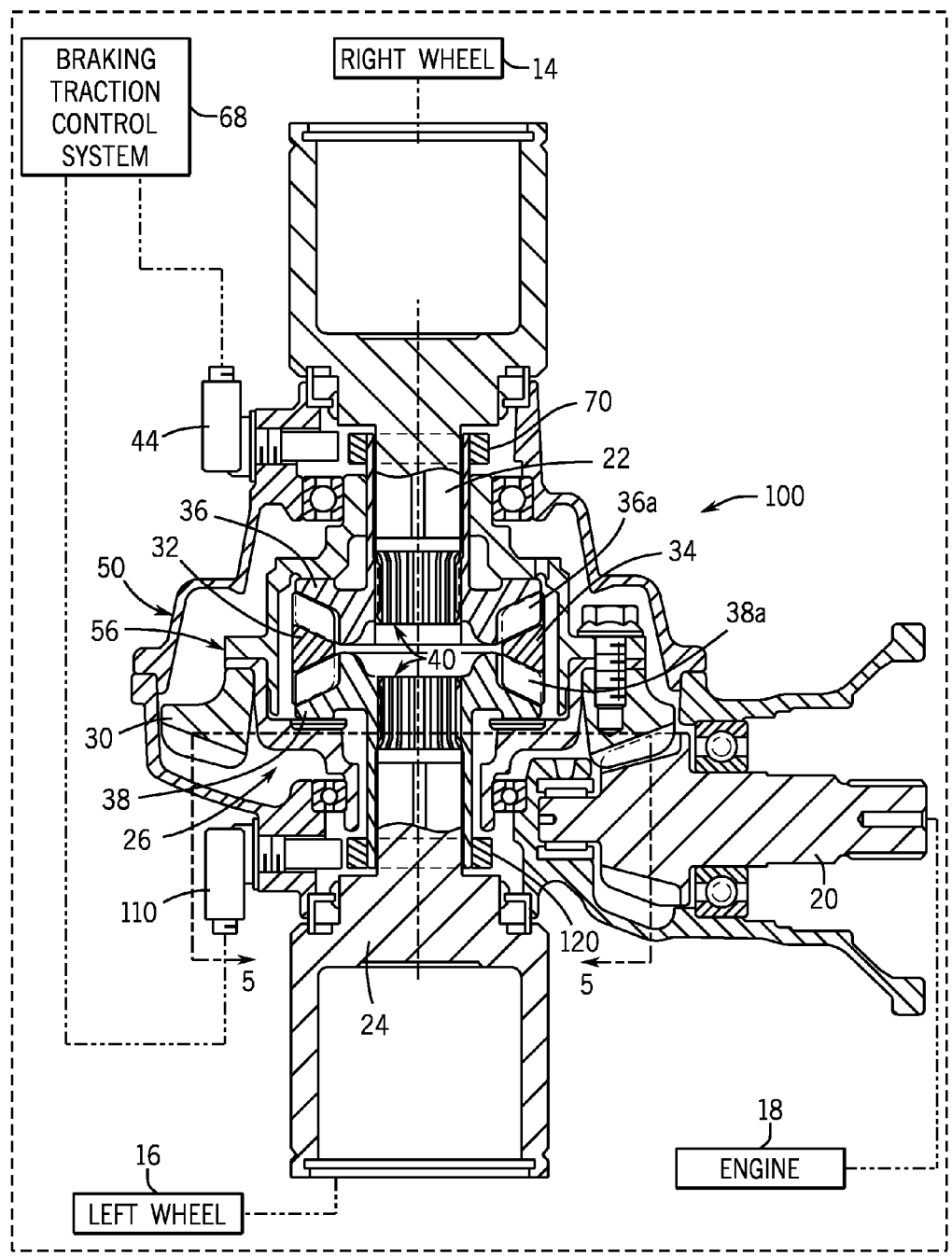
FIG. 4 is a schematic cross-sectional view of a vehicle having a differential assembly and speed sensor mounting arrangement according to another exemplary embodiment.
Figure 5:
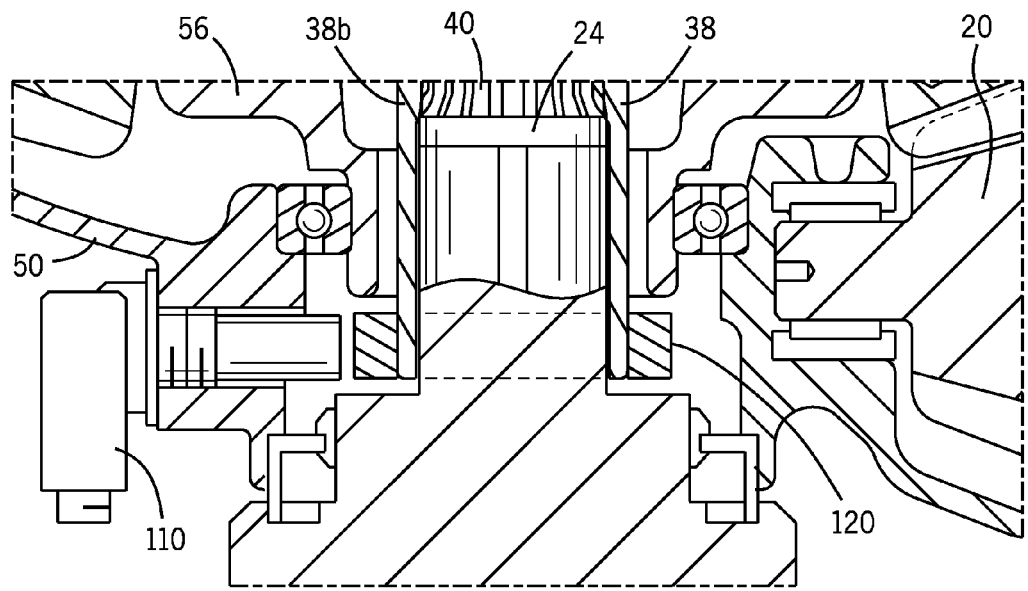
FIG. 5 is an enlarged partial perspective view of the differential assembly of FIG. 4 taken at the line 5-5 of FIG. 4 to show a pulsar ring mounted to a drive shaft face cam adjacent a speed sensor.
Figure 6:
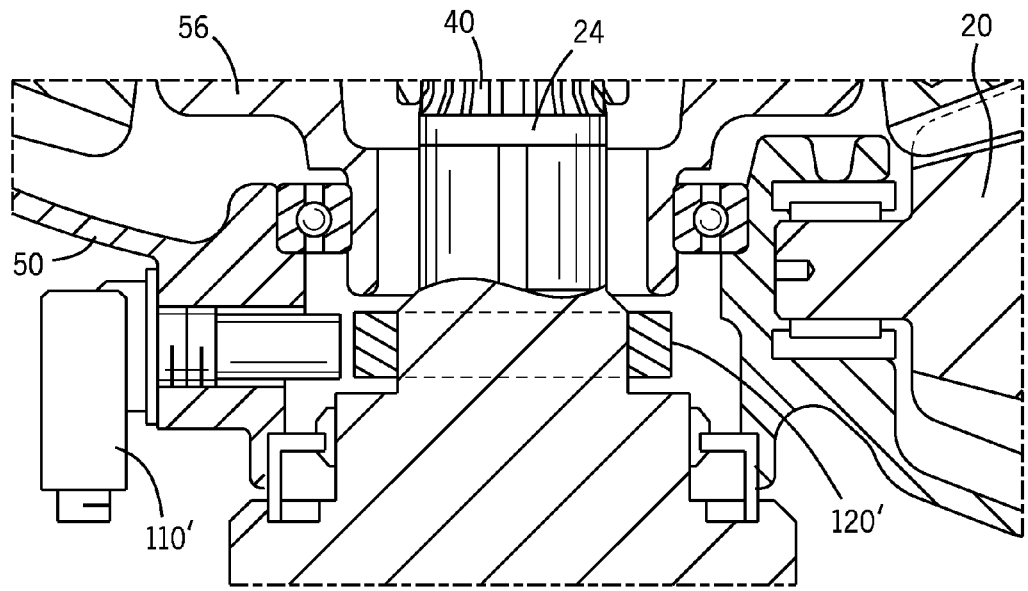
FIG. 6 is a partial cross-sectional view similar to FIG. 5 but showing a pulsar ring mounted directly to the drive shaft according to an alternate exemplary embodiment.

FIGS. 4-6 depict a differential assembly 100 for the vehicle 12 (vehicle 12 again shown schematically) having an alternate sensor mounting arrangement wherein a first speed sensor 110 is arranged to measure rotational speed of one of the right and left drive shafts and the second speed sensor 44 is arranged to measure rotational speed of the other of the right and left drive shafts. Except as indicated herein, the differential assembly 100 is the same as the differential assembly 10 of FIGS. 1-3 and thus like reference numerals are used on like components.

The vehicle 12 and/or the differential assembly 100 can include the pinion gear 20 that is rotatably driven by the engine 18 for transferring motive power from the engine 18 to the ground engaging members 14, 16 of the vehicle 12, and the right and left drive shafts 22, 24 coupled, respectively, to the ground engaging members 14, 16 of the vehicle 12. The drive train or differential 26 operatively connects to the pinion gear 20 to the right and left drive shafts 22, 24 for proportioning the motive power from the engine 18 between the ground engaging members 14, 16. The differential 26 includes the ring gear 30 meshingly coupled to the pinion gear 20, the cam followers 32, 34 meshingly coupled to the ring gear 30 and the pair of face cams 36, 38 meshingly coupled to the cam followers 32, 34. By this arrangement, the drive shafts 22, 24 are operatively connected to the ring gear 30 via the cam followers 32, 34 and the face cams 36, 38 for transferring motive power from the pinion gear 20 of the engine 18 to the ground engaging members 14, 16 associated with the right and left drive shafts 22, 24.

As shown in the illustrated embodiment, the ring gear 30, cam followers 32, 34 and face cams 36, 38 can be accommodated or housed in the gear casing 50. The casing 50 can be integral with or operatively connected to the pinion gear housing portion 52 that accommodates or houses the pinion gear 20. Again, in the illustrated embodiment, the ring gear 30 includes the internal differential housing 56 integrally formed or nonrotatably mounted thereto that accommodates the cam followers 32, 34 and at least the toothed portions or teeth 36a, 38a of the face cams 36, 38. The cam followers 32, 34 and toothed portions 36a, 38a of the face cams 36, 38 can be housed in the differential housing 56. As shown, the differential housing 56 is rotatably received within the casing 50 so as to be housed or accommodated within the casing 50.

The vehicle 12 and/or the differential assembly 100 include a first speed sensor 110 arranged to measure rotational speed of the left drive shaft 24 and the second speed sensor 44 arranged to measure rotational speed of the right drive shaft 22. At least one of the first and second sensors 110, 44 can be mounted to the casing 50. In the illustrated embodiment, each or both of the first and second speed sensors 110, 44 are mounted to the casing 50. Also, as shown schematically, each of the first and second speed sensors 110, 44 can be operatively connected to the braking traction control system 68, which uses input from the first and second speed sensors 110, 44 to calculate independent rotational speed for each of the drive shafts 22, 24. In the depicted embodiment of FIGS. 4-6, the rotational speeds for each of the right drive shaft 22 and the left drive shaft 24 are used by the braking traction control system 68 to selectively apply braking to the right wheel 14 and/or the left wheel 16 to improve traction control for the vehicle 10.

In particular, the first speed sensor 110 is located (e.g., mounted to the casing 50) adjacent the left drive shaft 24 and thus can directly measure the rotational speed of the left drive shaft 24 and provide this as an input to the braking traction control system 68. The vehicle 12 and/or the differential assembly 100 can include a pulsar ring 120 arranged to work in conjunction with the first speed sensor 110 for measuring rotational speed of the left drive shaft 24. In particular, the pulsar ring 120 can be nonrotatably mounted to the left drive shaft 24 for corotation therewith. Moreover, the pulsar ring 120 can be axially aligned with the second speed sensor 110 for cooperating therewith in measuring rotational speed of the left drive shaft 24. In the embodiment shown in FIGS. 4 and 5, the pulsar ring 120 is nonrotatably connected directly to the left face cam 38 that is itself nonrotatably connected to the left drive shaft 24 via the splined connection 40. In the embodiment illustrated, the pulsar ring 120 is housed in the casing 50 together with the ring gear 30, the cam followers 32, 34 and the face cams 36, 38. In particular, as shown best in FIG. 5, the pulsar ring 120 can be mounted to a portion 38b of the left face cam 38, wherein the portion 38b is an axially extending portion that is housed within the casing 50 but extends axially outward from the differential housing 56 in a sleeve-type or annular relation relative to the left drive shaft 24.

With reference to FIG. 6, an alternate embodiment is shown wherein a pulsar ring 120' is mounted directly to the left drive shaft 24. The first speed sensor 110' is mounted adjacent to the pulsar ring 120'. Also it should be appreciated that the first speed sensor 110, 110' can be mounted in a reversed orientation wherein the portion of the first speed sensor that projects from the casing 50 is directed laterally inwardly away from the left wheel 16 versus the orientation shown for the first speed sensor 110, 110' in FIGS. 5 and 6 wherein the projecting portion of the first speed sensor that extends out of the casing 50 projects laterally outwardly toward the left wheel 16.

With reference back to FIG. 4, the second speed sensor 44 is located (e.g., mounted to the casing 50) adjacent the right drive shaft 22 and thus can directly measure the rotational speed of the right drive shaft 22 and provide this as an input to the braking traction control system 68. Similar to the embodiments of FIGS. 1-3, the vehicle 12 and/or the differential assembly 100 can include the pulsar ring 70 arranged to work in conjunction with the second speed sensor 44 for measuring rotational speed of the right drive shaft 22. In the embodiment shown in FIG. 4 (and similar to the embodiment depicted in FIGS. 1 and 2), the pulsar ring 70 is nonrotatably connected directly to the right face cam 36 that is itself nonrotatably connected to the right drive shaft 22 via the splined connection 40. Again, in an alternative embodiment, a pulsar ring can be mounted directly to the right drive shaft 22 (not shown but similar to the embodiment of FIG. 3 which depicts pulsar ring 70' mounted directly to the right drive shaft 22). Also, the second speed sensor 44 depicted in FIG. 4 can be in a reversed orientation wherein the portion of the second speed sensor 44 that projects from the casing 50 is directed laterally inwardly away from the right wheel 14 versus the orientation shown for the second speed sensor 44 in FIG. 4 wherein the projecting portion of the second speed sensor 44 that extends out of the casing 50 projects laterally outwardly toward the right wheel 14.

Therefore, one aspect of FIGS. 4 and 5 shows the pulsar ring 120 for the first speed sensor 110 mounted to the face cam 38 and a second aspect of FIG. 6 shows the pulsar ring 120' for the first speed sensor 110' mounted to the left drive shaft 24. Though not shown, it is also possible to have one of the speed sensors mounted to the drive shaft for which it is arranged to measure and the other of the speed sensors mounted to the face cam for the drive draft for which it is arranged to measure.

It should be appreciated that the illustrated differential 26 is by way of example only and that the exemplary first and second speed sensors can be associated with alternative drive trains or differentials that operatively connect the drive member 20 to the right and left drive shafts 22, 24 for proportioning the motive power from the engine 18 between the ground engaging members 14, 16. For example, the drive train or differential can be a gear type differential wherein a pinion gear provided on an end portion of the drive member is meshingly coupled to a ring gear. Differential pinion gears housed in and connected to a differential housing turn with the ring gear. Drive pinion gears provided on the end portions of the right and left drive shafts 22, 24 are meshingly coupled to the differential pinion gears and turn the drive shafts. As provided above, the exemplary first speed sensor can be arranged to measure rotational speed of one of the ring gear and one of the drive shafts and the second speed sensor can be arranged to measure rotational speed of the other drive shaft.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A differential assembly for a vehicle, comprising:
a drive train for transferring motive power from an engine drive member to the right and left drive shafts which are coupled, respectively, to right and left ground engaging members of the vehicle, the drive train including a rotating element nonrotatably mounted to an internal differential housing and operatively engaged to the drive member and to the right and left drive shafts;
a first speed sensor arranged to measure rotational speed of (i) the rotating element or (ii) the left drive shaft;
a second speed sensor arranged to measure rotational speed of the right drive shaft when the first speed sensor is arranged to measure rotational speed of the left drive shaft;
a separate right pulsar ring nonrotatably mounted to an axial landing of a radially inward step portion defined on an end portion the right drive shaft distal from the right ground engaging member for corotation therewith, the right pulsar ring positioned between a radial wall of the step portion and the internal differential housing with a splined portion of the end portion received in the differential housing, the right pulsar ring axially aligned with the second speed sensor for cooperating therewith in measuring rotational speed of the right drive shaft.

2. The differential assembly of claim 1 wherein the first speed sensor is arranged to measure rotational speed of the left drive shaft.

3. The differential assembly of claim 1 further including a separate left pulsar ring nonrotatably mounted to the left drive shaft for corotation therewith, the left pulsar ring axially aligned with the first speed sensor for cooperating therewith in measuring rotational speed of the left drive shaft.

4. The differential assembly of claim 3 wherein the left pulsar ring is nonrotatably connected directly to the left drive shaft.

5. The differential assembly of claim 1 wherein the right pulsar ring is nonrotatably connected directly to the right drive shaft.

6. The differential assembly of claim 1 further including a casing in which the rotating element is accommodated, each of the first and second speed sensors being directly mounted to the casing.

7. The differential assembly of claim 1 wherein the drive train includes a pinion gear rotatably driven by the engine, a ring gear meshingly coupled to the pinion gear and nonrotatably mounted to the internal differential housing, cam followers meshingly coupled to the internal differential housing and face cams meshingly coupled to the cam followers, wherein the right and left drive shafts are nonrotatably coupled, respectively, to the face cams, and wherein the first speed sensor arranged to measure rotational speed of (i) the ring gear or (ii) one of the right and left drive shafts.

8. The differential assembly of claim 7 wherein the internal differential housing accommodates the cam followers and at least toothed portions of the face cams.

9. The differential assembly of claim 7 further including a left pulsar ring nonrotatably mounted to the left drive shaft for corotation therewith, the left pulsar ring axially aligned with the first speed sensor for cooperating therewith in measuring rotational speed of the left drive shaft, wherein the left pulsar ring is nonrotatably connected directly to the face cam that is nonrotatably connected to the left drive shaft.

10. The differential assembly of claim 7 wherein the right pulsar ring is nonrotatably connected directly to the face cam that is nonrotatably connected to the right drive shaft.

11. The differential assembly of claim 1 wherein each of the first and second speed sensors are operatively connected to a braking traction control system.

12. A vehicle, comprising:
right and left driven ground engaging members;
an engine for providing motive power for driving the right and left driven ground engaging members;
a drive member rotatably driven by the engine;
right and left drive shafts coupled, respectively, to the right and left driven ground engaging members;
a differential operatively connected to the drive member and to right and left drive shafts for proportioning the motive power from the engine between the right and left driven ground engaging members, the differential including a ring gear operatively engaged to the drive member and a differential housing integrally formed or nonrotatably mounted to the ring gear;
a first speed sensor arranged to measure rotational speed of the left drive shaft; and
a second speed sensor arranged to measure rotational speed of the right drive shaft, wherein the differential includes a casing in which each of the ring gear and differential housing is housed, a separate left pulsar ring nonrotatably coupled to a radially inward step portion defined in an end portion the left drive shaft distal from the left driven ground engaging member, and a separate right pulsar ring nonrotatably coupled to a radially inward step portion defined in an end portion of the right drive shaft distal from the right driven ground engaging member, wherein each of the left pulsar ring and right pulsar ring are positioned in a space defined by the casing, each respective step portion of the left drive shaft and right drive shaft and the differential housing, wherein a distal end portion of the drive member faces the step portion of one of the left drive shaft and right drive shaft.

13. The vehicle of claim 12 wherein at least one of the first and second speed sensors is directly mounted to the casing.

14. The vehicle of claim 13 wherein both the first and second speed sensors are directly mounted to the casing, the first speed sensor mounted to the casing at a location adjacent the left drive shaft and the second speed sensor mounted to the casing at a location adjacent the right drive shaft.

15. The vehicle of claim 13 wherein each of the left pulsar ring and right pulsar ring is housed in the casing.

16. The vehicle of claim 12, wherein the differential includes a pinion gear arranged for toothed engagement the ring gear, cam followers arranged for toothed engagement with the differential housing and right and left face cams arranged for toothed engagement with the cam followers, the cam followers and toothed portions of the face cams housed in the differential housing, the right face cam nonrotatably coupled to the right drive shaft and the left face cam nonrotatably coupled to the left drive shaft.

17. The vehicle of claim 16 wherein the left pulsar ring is mounted directly to one of the left drive shaft and the left face cam, and the right pulsar ring is mounted directly to one of the right drive shaft and right face cam.

18. The vehicle of claim 16 wherein the left pulsar ring is mounted directly to a portion of the left face cam and the right pulsar ring is mounted directly to a portion of the right face cam, and further including a casing in which the differential housing is rotatably received wherein each of the left face cam portion and the right face cam portion is housed within the casing and extends axially outward of the differential housing.

* * * * *